United States Patent
Seo

(10) Patent No.: US 7,144,033 B2
(45) Date of Patent: Dec. 5, 2006

(54) INSTALLATION STRUCTURE OF AIR BAG MODULE

(75) Inventor: Young Duk Seo, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 290 days.

(21) Appl. No.: 10/746,351

(22) Filed: Dec. 29, 2003

(65) Prior Publication Data
US 2005/0140120 A1 Jun. 30, 2005

(51) Int. Cl.
*B60R 21/16* (2006.01)
(52) U.S. Cl. .................................. 280/728.2
(58) Field of Classification Search ............ 280/728.2, 280/728.3, 731
See application file for complete search history.

(56) References Cited

U.S. PATENT DOCUMENTS 5,145,207 A * 9/1992 Bederka et al. ............. 280/732

* cited by examiner

*Primary Examiner*—Faye M. Fleming
(74) *Attorney, Agent, or Firm*—Greenblum & Bernstein, P.L.C.

(57) ABSTRACT

Disclosed is an installation structure of an air bag module comprising a fixed bracket installed in a frame of a car, an air bag module for expanding and protruding an cushion to a passenger when the car collides with an object, and a movable bracket installed on the air bag module and slidably connected to the fixed bracket. The air bag module is movable in a slide direction of the fixed and movable brackets, thus allowing an installation position of the air bag module to be adjusted even when design tolerance is high.

15 Claims, 5 Drawing Sheets

INSTALLATION STRUCTURE OF AIR BAG MODULE

BACKGROUND OF THE INVENTION

1. Field of the Invention

The present invention relates to an installation structure of an air bag module, and more particularly to an installation structure of an air bag module, in which a movable bracket of an air bag module is installed on a fixed bracket of a frame of a car so that the movable bracket slidably moves on the fixed bracket.

2. Description of the Related Art

As shown in FIGS. 1 and 2, a conventional air bag apparatus for vehicles comprises an air bag case 4 connected to an instrument panel 2, a cushion 6 located on a front surface of the air bag case 4, an inflator 8 located on a rear surface of the air bag case 4 for injecting gas in a high-pressure state to the cushion 6 so that the cushion 6 is expanded when a car provided with the air bag apparatus collides with an object, and an impact sensor for sensing the collision of the car. Thereby, when the car provided with the air bag apparatus collides with an object, the cushion 6 is expanded and protruded toward a passenger, thereby absorbing kinetic energy of the passenger and protecting the passenger from injury generated by accidents.

The air bag case 4 includes a cushion housing 3 for receiving the cushion 6, and a can housing 5 connected to a rear surface of the cushion housing 3 for receiving the inflator 8.

The cushion housing 3 is provided with a flange 10 bolted to the instrument panel 2, and the can housing 5 is provided with a bracket 12 bolted to a cowl cross member 1 so that the can housing 5 is put on the cowl cross member 1.

Since each of a locking portion between the flange 10 and the instrument panel 2 and a locking portion between the bracket 12 and the cowl cross member 1 has a fixed position and a fixed shape, when the flange 10 and the instrument panel 2 are bolted together and the bracket 12 and the cowl cross member 1 are bolted together, it is difficult to assemble the air bag case 4 due to tolerance between the flange 10 and the instrument panel 2 and tolerance between the bracket 12 and the cowl cross member 1.

Of course, the flange 10 and the bracket 12 are designed such that the above-described assembly tolerances are taken into consideration. However, the assembly tolerance between the flange 10 and the instrument panel 2 and the assembly tolerance between the bracket 12 and the cowl cross member 1 affect each other, thereby being seriously increased and thus causing a difficulty in assembling the air bag case 4 and a high defective rate of an assembly.

SUMMARY OF THE INVENTION

Therefore, the present invention has been made in view of the above problems, and it is an object of the present invention to provide an installation structure of an air bag module, in which a connection portion between the air bag module and a frame of a car is movable, thereby improving assembling efficiency.

In accordance with one aspect of the present invention, the above and other objects can be accomplished by the provision of an installation structure of an air bag module comprising: a fixed bracket installed in a frame of a car; an air bag module for expanding and protruding an cushion to a passenger when the car collides with an object; and a movable bracket installed on the air bag module, and slidably connected to the fixed bracket.

In accordance with another aspect of the present invention, there is provided an installation structure of an installation structure of an air bag module comprising: an instrument panel and a cowl cross member, installed in a frame of a car; an air bag module for expanding and protruding an cushion to a passenger when the car collides with an object; a mount bracket installed at a side surface of the air bag module, and provided with a through hole formed therethrough corresponding to a through hole formed through the cowl cross member so that the mount bracket is connected to the cowl cross member; a fixed bracket installed on the instrument panel; and a movable bracket installed on the air bag module, and slidably connected to the fixed bracket.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
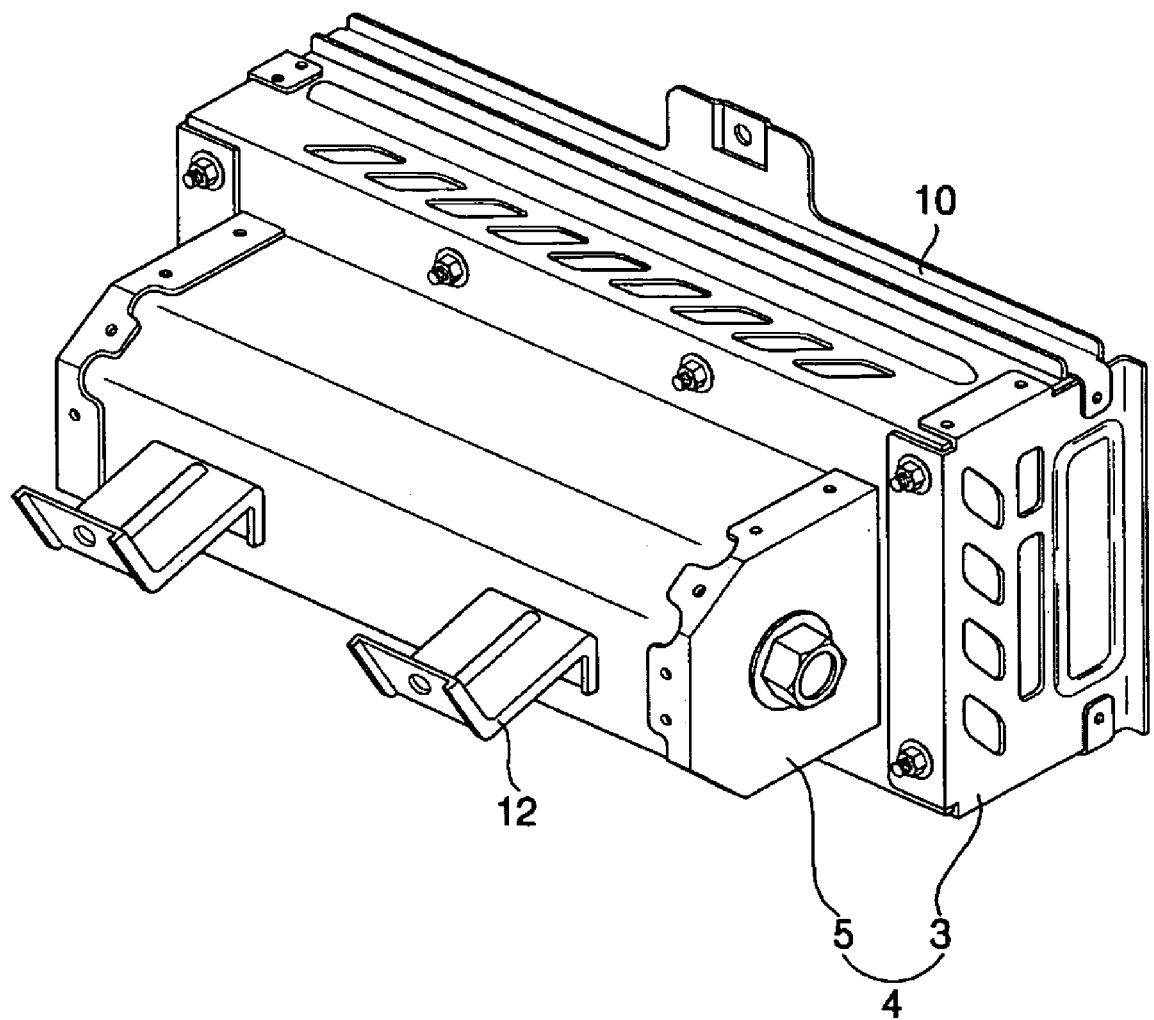
FIG. 1 is a perspective view of a conventional air bag module.
Figure 2:
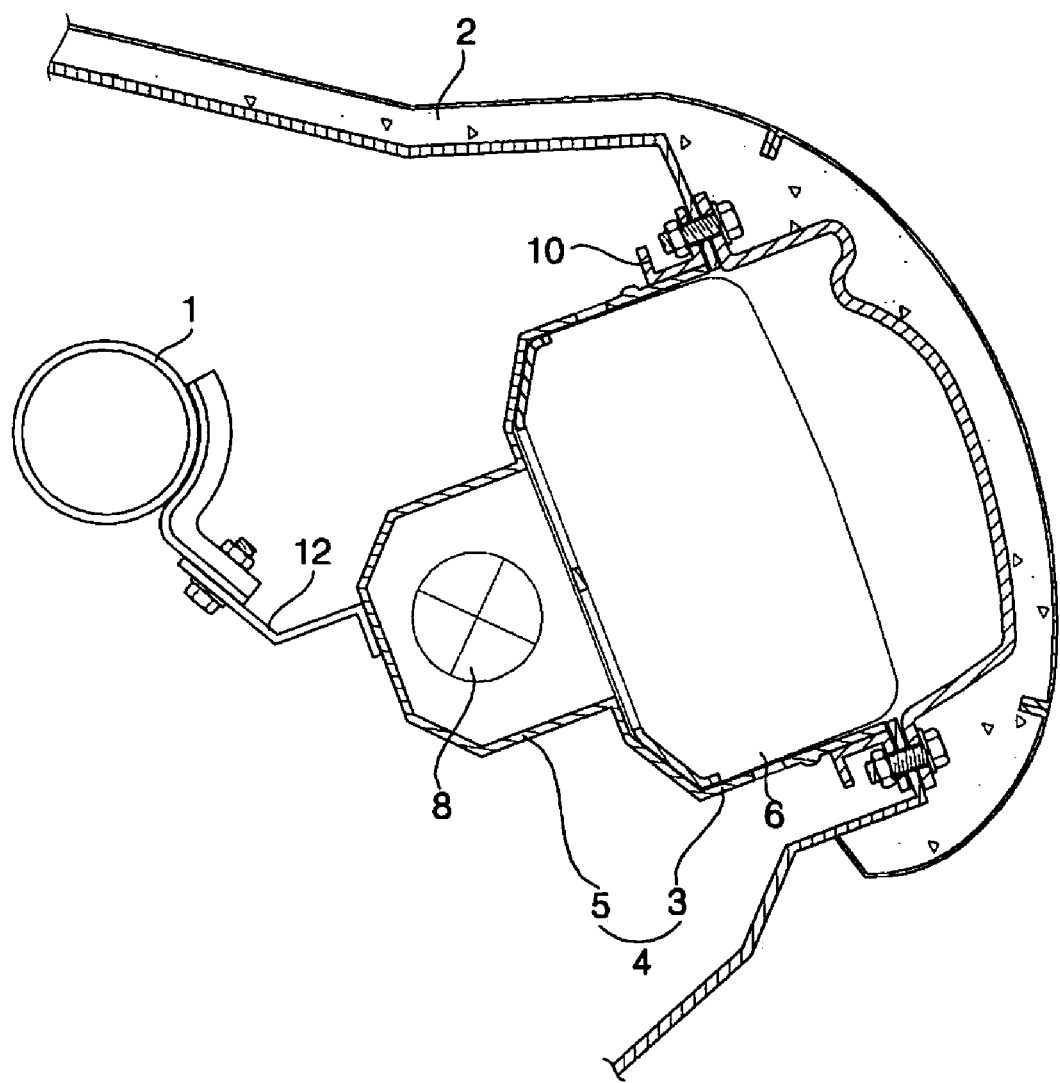
FIG. 2 is a cross-sectional view of an installation structure of the conventional air bag module.
Figure 3:
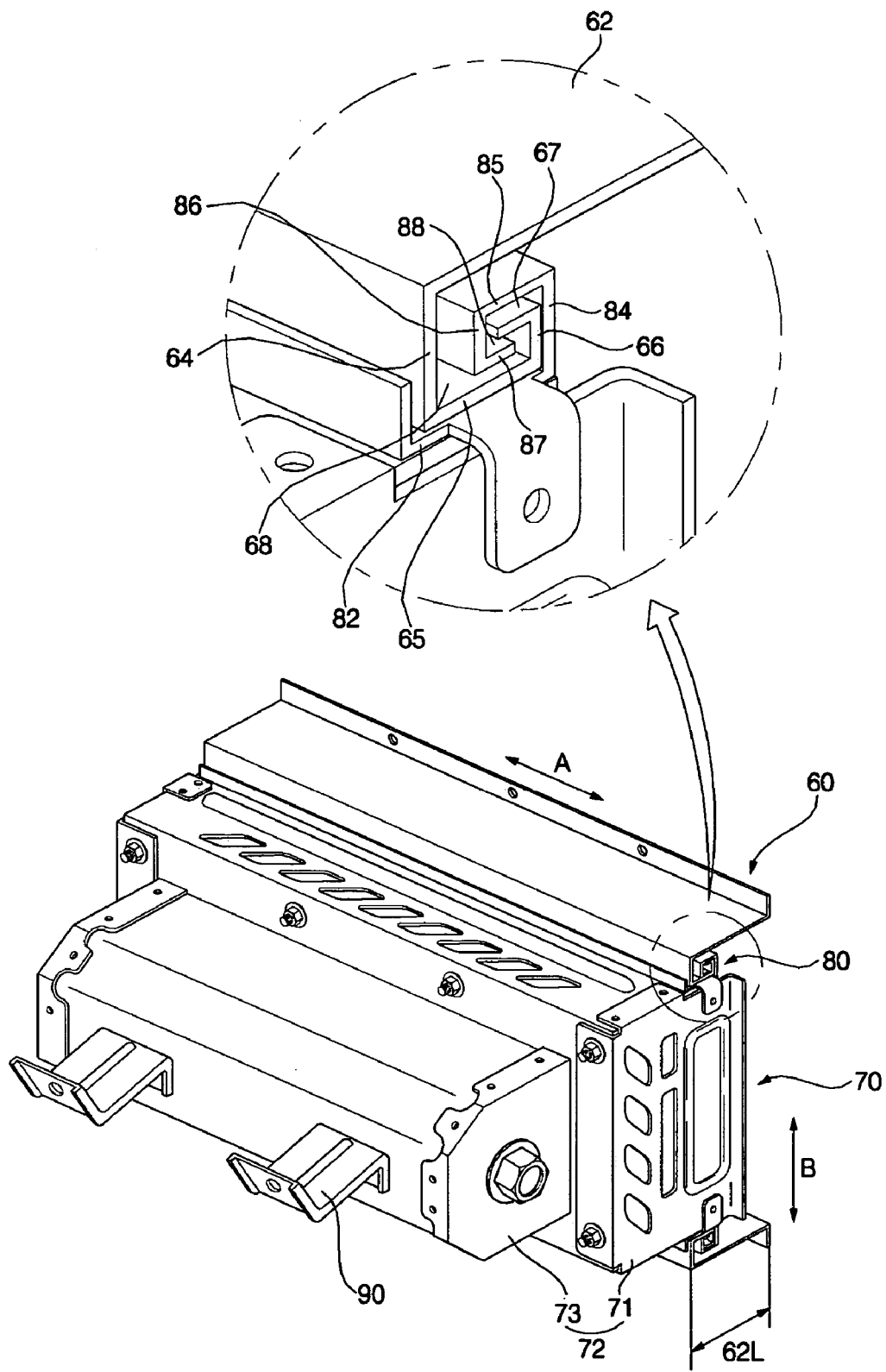
FIG. 3 is a perspective view of an installation structure of an air bag module in accordance with a first embodiment of the present invention.
Figure 4:
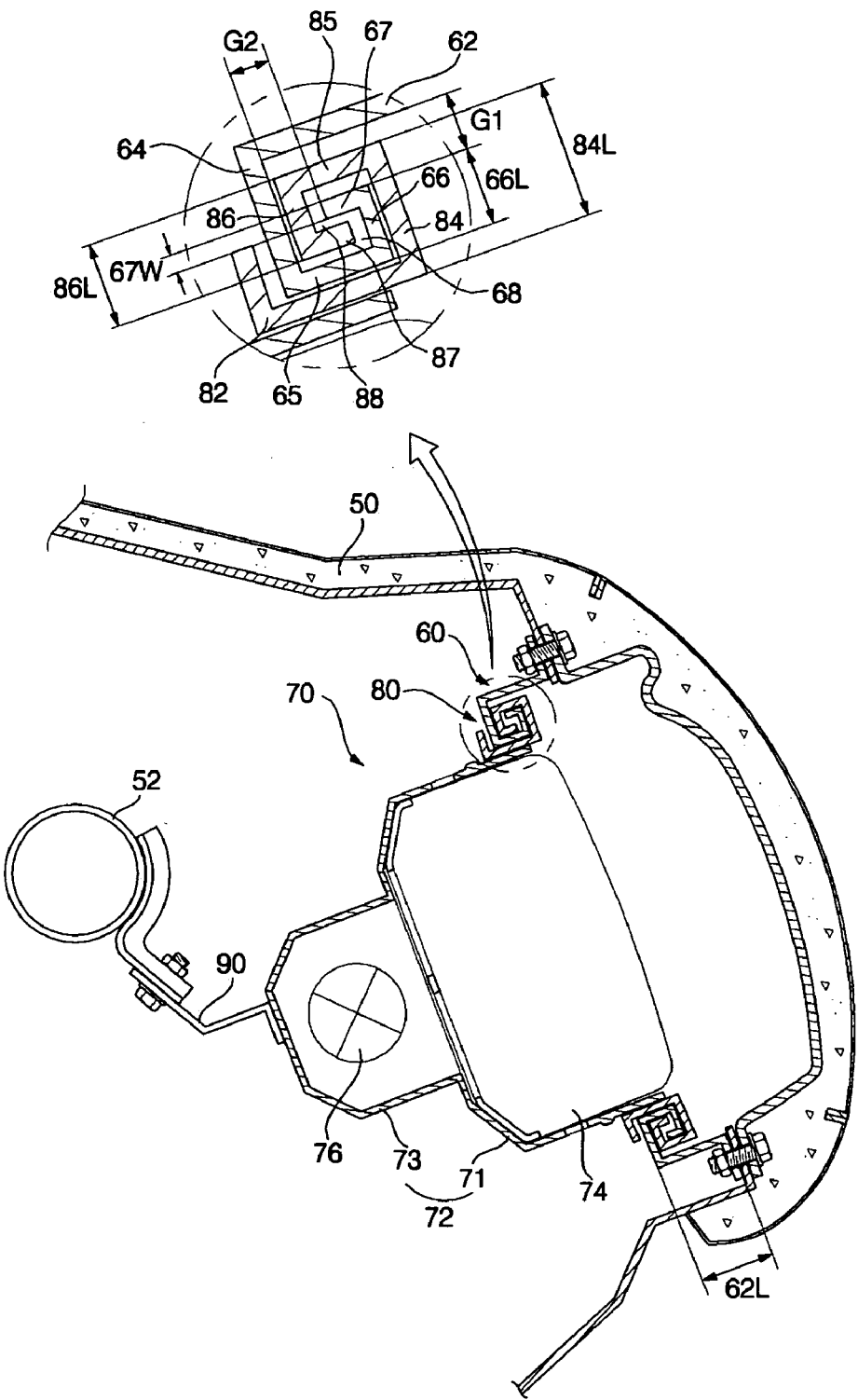
FIG. 4 is a cross-sectional view of the installation structure of the air bag module in accordance with the first embodiment of the present invention.

A first embodiment of the present invention is described in detail with reference to FIGS. 3 and 4, as follows.

An installation structure of an air bag module in accordance with the first embodiment of the present invention comprises a fixed bracket 60 installed on an instrument panel 50 of a frame of a car so that the fixed bracket 60 is opposite to the interior of the car, an air bag module 70 installed on the instrument panel 50 so that the air bag module 70 is opposite to the interior of the car and an cushion is protruded toward a passenger when the car collides with an object, and a movable bracket 80 installed on the air bag module 70 and connected to the fixed bracket 60 so that the movable bracket 80 slides on the fixed bracket.

The fixed bracket 60 includes a main body 62 bolted to the instrument panel 50, and a rail connected to an end of the main body 62, directed to the air bag module 70, for guiding a sliding motion of the movable bracket 80. The movable bracket 80 includes a main body 82 fixed to the air bag module 70, and a track connected to an end of the main body 82, directed to the instrument panel 50, for sliding along the rail.

The main body 62 of the fixed bracket 60 for connecting the instrument panel 50 to the air bag module 70 has a designated length 62L so that the air bag module 70 is separated from the instrument panel 50.

The rail of the fixed bracket 60 includes a first panel 64 extended perpendicularly from the main body 62 of the fixed bracket 60 and directed to the air bag module 70, a second panel 65 extended perpendicularly from the first panel 64 and directed to the frame of the car, a third panel 66 extended perpendicularly from the second panel 65 and directed to the main body 62 of the fixed bracket 60, and a fourth panel 67 extended perpendicularly from the third panel 66 and directed to the first panel 64. That is, the rail is rolled up in a square shape toward the main body 62 of the fixed bracket 60, and is provided with a slide passage 68, into which the movable bracket 80 is inserted and along which the movable bracket 80 slides, formed by the first to fourth panels 64 to 67.

Here, the third panel 66 of the rail has a length shorter than that of the first panel 64 of the rail so that the third panel 66 is separated from the main body 62 of the fixed bracket 60 by a designated distance (G1), and the fourth panel 67 of the rail has a length shorter than that of the second panel 65 of the rail so that the fourth panel 67 is separated from the first panel 64 of the rail by a designated distance (G2).

The track of the movable bracket 80 includes a first panel 84 extended perpendicularly from the main body 82 of the movable bracket 80 and directed to the opposite side of the air bag module 70 so that the first panel 84 of the track is put on a side surface of the third panel 66 of the rail, a second panel 85 extended perpendicularly from the first panel 84 and directed to the first panel 64 of the rail so that the second panel 85 is interposed between the main body 62 of the fixed bracket 60 and the fourth panel 67 of the rail, a third panel 86 extended perpendicularly from the second panel 85 so that the third panel 86 is interposed between the first and third panels 64 and 66 of the rail, and a fourth panel 87 extended perpendicularly from the third panel 86 so that the fourth panel 87 is interposed between the first and fourth panels 64 and 67 of the rail. In the same manner as the rail of the fixed bracket 60, the track of the movable bracket 80 is rolled up in a square shape toward the main body 82 of the movable bracket 80, and is provided with a slide passage 88, into which the fixed bracket 60 is inserted and along which the movable bracket 60 slides, formed by the first to fourth panels 84 to 87.

Here, the first panel 84 of the track has a length 84L, in a direction between the fixed bracket 60 and the movable bracket 80, longer than that 66L of the third panel 66 of the rail and the third panel 86 of the track has a length 86L, in the direction between the fixed bracket 60 and the movable bracket 80, longer than a width 67W of the fourth panel 67 of the rail so that the track moves between the fixed bracket 60 and the air bag module 70.

By slidably inserting the track of the movable bracket 80 into the slide passage 88 of the rail of the fixed bracket 60 so that the track of the movable bracket 80 is engaged with the rail of the fixed bracket 60, the air bag module 70 can be firmly supported to the frame of the car, and move along a slide direction (shown by arrow "A") of the track and in a direction (shown by arrow "B") between the fixed bracket 60 and the air bag module 70 when the air bag module 70 is installed on the frame of the car.

The air bag module 70 includes an air bag case 72 provided with an opened surface being opposite to the instrument panel 50, a cushion 74 accommodated by the air bag case 72, and an inflator 76 for supplying gas for expanding the cushion 74 to the cushion 74 when the car provided with the air bag module 70 collides with an object.

The air bag case 72 has a box structure, and includes an cushion-receiving chamber 71 for receiving the cushion 74, and an inflator-receiving chamber 73, formed in a can shape and connected to the cushion—receiving chamber 71 in a straight line, for receiving the inflator 76.

Here, since the opened surface of the air bag case 72 serves as an exit for allowing the expanded cushion 74 to be protruded toward the interior of the car, the fixed bracket 60 is located at the outside of the air bag case 72 so that the fixed bracket 60 does not obstruct the protrusion of the cushion 74.

The fixed bracket 60 is installed in a pair so that two units of the fixed bracket 60 are respectively formed on two opposite side surfaces among four side surfaces of the air bag case 72, thereby firmly and stably supporting the air bag module 70. Further, the movable bracket 80 is installed in a pair so that two units of the movable bracket 80 are respectively formed on the two opposite side surfaces of the air bag case 72 corresponding to the two units of the fixed bracket 60.

Since the cushion-receiving chamber 71 of the air bag case 72 is adjacent to the instrument panel 50, the movable bracket 80 is installed in the cushion-receiving chamber 71 of the air bag case 70.

Hereinafter, installation of the air bag module 70 of the present invention will be described in detail.

The fixed bracket 60 is bolted to the instrument panel 50, and the movable bracket 80 is bolted to the air bag module 70. Thereafter, the air bag module 70 is located such that the track of the movable bracket 80 and the rail of the fixed bracket 60 are straightly arranged along a slide direction, and is then pushed to the instrument panel 50 so that the track of the movable bracket 80 is inserted into the slide passage 68 of the rail of the fixed bracket 60. By slidably inserting the track of the movable bracket 80 into the slide passage 68 of the rail of the fixed bracket 60, the air bag module 70 is firmly fixed and supported to the instrument panel 50.

A mount bracket 90, which is bolted to the cowl cross member 52 of the frame of the car, may be installed on the air bag module 70, thus allowing the air bag module 70 to be firmly fixed to the cowl cross member 52.

Here, after the fixed bracket 60 and the movable bracket 80 are connected to each other by the slide method, the mount bracket 90 is bolted to the cowl cross member 52. Since the air bag module 70 moves along the slide direction (shown by arrow "A") of the track and in the direction (shown by arrow "B") between the fixed bracket 60 and the air bag module 70, a bolted position of the mount bracket 90 easily coincides with a bolted position of the cowl cross member 52 when the mount bracket 90 is bolted to the cowl cross member 52.

After the mount bracket 90 is bolted to the cowl cross member 52, the sliding of the movable bracket 80 is restricted, thereby causing the air bag module 70 not to move any more and to be firmly fixed to the instrument panel 50 and the cowl cross member 52.

In case that a plurality of the mount brackets 90 are installed on one side surface of the air bag module 70, the mount brackets 90 are parallel in the slide direction (shown by arrow "A") of the fixed bracket 60 and the movable bracket 80.

Hereinafter, structures of a rail and a track in each of installation structures of air bag modules in accordance with second to fourth embodiments of the present invention will be described in detail with reference to FIGS. 5a to 5c. Some parts in these embodiments are substantially the same as those in the first embodiment and thus denoted by the same reference numerals even though they are depicted in different drawings. Further, a part of the construction and operation of these embodiments are substantially the same as those of the first embodiment, and a detailed description thereof will thus be omitted because it is considered to be unnecessary.

Figure 5A:
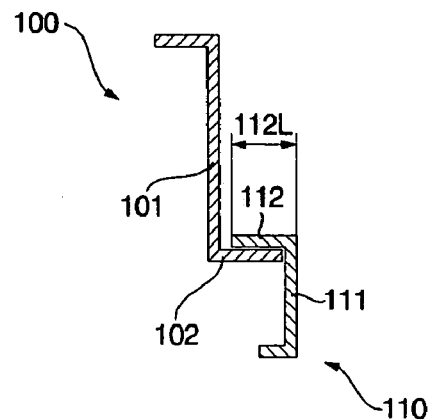
FIGS. 5a, 5b and 5c, are schematic views respectively illustrating structures of a rail and a track in each of installation structures of air bag modules in accordance with second to fourth embodiments of the present invention.

In accordance with the second embodiment of the present invention as shown in FIG. 5a, a rail 102 of a fixed bracket is bent perpendicularly from a main body of the fixed bracket 100 and directed to the air bag module, and a track 112 of a movable bracket 110 is bent perpendicularly from a main body 111 of the movable bracket 110 and directed to the rail 102 so that the track 112 is put on the rail 102.

Here, the track 112 has a length 112L shorter than that of the rail 102.

Figure 5B:
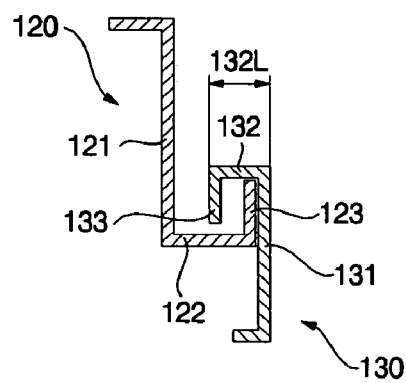

In accordance with the third embodiment of the present invention as shown in FIG. 5b, a rail of a fixed bracket 120 includes a first panel 122 extended perpendicularly from a main body 121 of the fixed bracket 120 and directed to the air bag module, and a second panel 123 extended perpendicularly from the first panel 122 and directed to the instrument panel. A track of a movable bracket 130 includes a first panel 132 extended perpendicularly from a main body 131 of the movable bracket 130 and directed to the fixed bracket 120 so that the first panel 132 is put on an upper surface of the second panel 123 of the rail, and a second panel 133 extended perpendicularly from the first panel 132 and directed to the first panel 122 of the rail so that the second panel 133 is put on a side surface of the second panel 123.

Further, the first panel 132 of the track has a length 132L shorter than that of the first panel 122 of the rail.

Figure 5C:
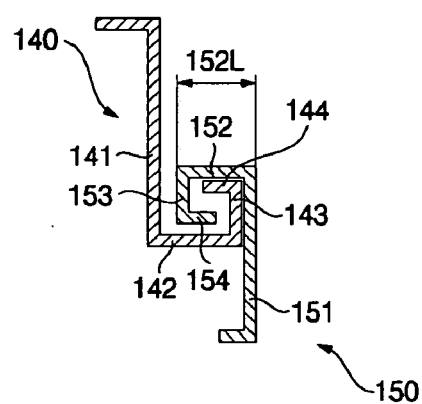

In accordance with the fourth embodiment of the present invention as shown in FIG. 5c, a rail of a fixed bracket 140 includes a first panel 142 extended perpendicularly from a main body 141 of the fixed bracket 140 and directed to the air bag module, a second panel 143 extended perpendicularly from the first panel 142 and directed to the instrument panel, and a third panel 144 extended perpendicularly from the second panel 143 and directed to the main body 141 of the fixed bracket 140.

A track of a movable bracket 150 includes a first panel 152 extended perpendicularly from a main body 151 of the movable bracket 150 and directed to the fixed bracket 140 so that the first panel 132 is put on a side surface of the third panel 144 of the rail, a second panel 153 extended perpendicularly from the first panel 152 and directed to the first panel 142 of the rail, and a third panel 154 extended perpendicularly to the second panel 153 and directed to the third panel 144 of the rail so that the third panel 154 is opposite to the first panel 152.

Further, the first panel 152 of the track has a length 152L shorter than that of each of the third panel 144 of the rail and the third panel 154 of the track.

Those skilled in the art will appreciate that various modifications of numbers of bends of the rail and the track are possible, without departing from the scope and spirit of the invention as disclosed in the accompanying claims.

As apparent from the above description, the present invention provides an installation structure of an air bag module, in which a fixed bracket is installed on an instrument panel of a frame of a car and a movable bracket is installed on an air bag module so that the movable bracket is slidably connected to the fixed bracket, thereby allowing the air bag module to move along a slide direction of the movable bracket on the fixed bracket so that an installation position of the air bag module is adjusted even when design tolerance is high, and improving assembling efficiency of the air bag module.

Further, since a rail of the fixed bracket is engaged with a track of the movable bracket under the condition that there is clearance between the fixed bracket and the air bag module, the air bag module is movable in a direction toward the fixed bracket.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An installation structure of an air bag module comprising:
   a fixed bracket installed in a frame of a car;
   an air bag module that expands and protrudes a cushion to a passenger when the car collides with an object; and
   a movable bracket installed on the air bag module, and slidably connected to the fixed bracket,
   wherein an end of the fixed bracket is directed to the frame of the car, is bent in a direction opposite to the air bag module and contacts the frame of the car.

2. The installation structure as set forth in claim 1, wherein:
   the fixed bracket is provided with a rail connected to a portion of the fixed bracket directed to the air bag module; and
   the movable bracket is provided with a track and connected to a portion of the movable bracket directed to the fixed bracket so that the track of the movable bracket slides along the rail of the fixed bracket.

3. The installation structure as set forth in claim 2, wherein:
   an end of the fixed bracket, directed to the air bag module, is perpendicularly bent toward the air bag module; and
   an end of the movable bracket is perpendicularly bent toward the fixed bracket so that the end of the movable bracket contacts the rail.

4. The installation structure as set forth in claim 3, wherein the track bent from the movable bracket has a length shorter than that of the rail.

5. The installation structure as set forth in claim 2, wherein:
   the rail includes a first panel extended perpendicularly from the fixed bracket and directed to the air bag module, and a second panel extended perpendicularly from the first panel and directed to the frame of the car; and
   the track includes a first panel extended perpendicularly from the movable bracket so that the first panel is put on an upper surface of the second panel of the rail, and a second panel extended perpendicularly from the first panel and directed to the first panel of the rail so that the second panel of the track is put on a side surface of the second panel of the rail.

6. The installation structure as set forth in claim 5, wherein the first panel of the track has a length shorter than that of the first panel of the rail.

7. An installation structure of an air bag module comprising:
   a fixed bracket installed in a frame of a car;
   an air bag module that expands and protrudes a cushion to a passenger when the car collides with an object; and a movable bracket installed on the air bag module, and slidably connected to the fixed bracket, wherein:

the fixed bracket is provided with a rail connected to a portion of the fixed bracket directed to the air bag module;

the movable bracket is provided with a track and connected to a portion of the movable bracket directed to the fixed bracket so that the track of the movable bracket slides along the rail of the fixed bracket;

the rail includes a first panel extended perpendicularly from the fixed bracket and directed to the air bag module, a second panel extended perpendicularly from the first panel and directed to the frame of the car, and a third panel extended perpendicularly from the second panel and directed to the fixed bracket; and the track includes a first panel extended perpendicularly from the movable bracket so that the first panel of the track is put on a side surface of the third panel of the rail, a second panel extended perpendicularly from the first panel and directed to the first panel of the rail, and a third panel extended perpendicularly to the second panel and directed to the third panel of the rail so that the third panel of the track is opposite to the first panel of the track.

8. The installation structure as set forth in claim 7, wherein the first panel of the track has a length shorter than each of those of the third panel of the track and the third panel of the rail.

9. An installation structure of an air bag module comprising:

a fixed bracket installed in a frame of a car;

an air bag module that expands and protrudes a cushion to a passenger when the car collides with an object; and a movable bracket installed on the air bag module, and slidably connected to the fixed bracket, wherein:

the fixed bracket is provided with a rail connected to a portion of the fixed bracket directed to the air bag module;

the movable bracket is provided with a track and connected to a portion of the movable bracket directed to the fixed bracket so that the track of the movable bracket slides along the rail of the fixed bracket;

the rail includes a first panel extended perpendicularly from the fixed bracket and directed to the air bag module, a second panel extended perpendicularly from the first panel and directed to the frame of the car, a third panel extended perpendicularly from the second panel and directed to the fixed bracket, and a fourth panel extended perpendicularly from the third panel and directed to the first panel; and the track includes a first panel extended perpendicularly from the movable bracket and directed to the opposite side of the air bag module so that the first panel of the track is put on a side surface of the third panel of the rail, a second panel extended perpendicularly from the first panel of the track and directed to the first panel of the rail so that the second panel of the track is interposed between the fixed bracket and the fourth panel of the rail, a third panel extended perpendicularly from the second panel of the track so that the third panel of the track is interposed between the first and third panels the rail, and a fourth panel extended perpendicularly from the third panel of the track so that the fourth panel of the track is interposed between the first and fourth panels of the rail.

10. The installation structure as set forth in claim 9, wherein:

the first panel of the track has a length, in a direction between the fixed bracket and the movable bracket, longer than that of the third panel of the rail; and the third panel of the track has a length, in the direction between the fixed bracket and the movable bracket, longer than a width of the fourth panel of the rail.

11. The installation structure as set forth in claim 1, wherein:

the fixed bracket is installed in a pair so that two units of the fixed bracket are respectively formed on two opposite side surfaces among four side surfaces of the air bag case; and the movable bracket is installed in a pair so that two units of the movable bracket respectively correspond to the two units of the fixed bracket.

12. The installation structure as set forth in claim 11, wherein the fixed bracket has a designated length from the frame of the car to the air bag module so that the fixed bracket does not contact the frame of the car.

13. The installation structure as set forth in claim 1, wherein the end of the fixed bracket is bolted to the frame of the car.

14. An installation structure of an air bag module comprising:

an instrument panel and a cowl cross member, installed in a frame of a car;

an air bag module that expands and protrudes a cushion to a passenger when the car collides with an object;

a mount bracket installed at a side surface of the air bag module, and provided with a through hole formed therethrough corresponding to a through hole formed through the cowl cross member so that the mount bracket is connected to the cowl cross member;

a fixed bracket installed on the instrument panel; and a movable bracket installed on the air bag module, and slidably connected to the fixed bracket, wherein an end of the fixed bracket is directed to the frame of the car, is bent in a direction opposite to the air bag module and contacts the frame of the car.

15. The installation structure as set forth in claim 14, wherein:

a plurality of the mount brackets in parallel are installed on one side surface of the air bag module; and the fixed bracket and the movable brackets are slidably connected to each other in an installation direction of the plural mount brackets.

* * * * *